US008985588B2

(12) United States Patent
Feistel

(10) Patent No.: US 8,985,588 B2
(45) Date of Patent: Mar. 24, 2015

(54) SEAL ARRANGEMENT

(75) Inventor: Norbert Feistel, Thur (CH)

(73) Assignee: Burckhardt Compression AG, Winterthur (CH)

( * ) Notice: Subject to any disclaimer, the term of this patent is extended or adjusted under 35 U.S.C. 154(b) by 230 days.

(21) Appl. No.: 13/819,606

(22) PCT Filed: Aug. 31, 2011

(86) PCT No.: PCT/EP2011/065054
§ 371 (c)(1),
(2), (4) Date: Apr. 18, 2013

(87) PCT Pub. No.: WO2012/028661
PCT Pub. Date: Mar. 8, 2012

(65) Prior Publication Data
US 2013/0154197 A1    Jun. 20, 2013

(30) Foreign Application Priority Data

Aug. 31, 2010   (EP) .................................... 10174738

(51) Int. Cl.
*F16J 9/10*    (2006.01)
*F16J 9/16*    (2006.01)
(Continued)

(52) U.S. Cl.
CPC .... *F16J 9/06* (2013.01); *F16J 9/10* (2013.01); *F16J 15/181* (2013.01); *F16J 9/22* (2013.01);
(Continued)

(58) Field of Classification Search
CPC ............... F16J 9/10; F16J 9/22; F16J 9/28; F16J 15/18; F16J 15/181; F16J 15/184; F16J 15/56; F04B 39/041; F04B 39/042; F04B 53/143
USPC .......................... 277/489–492, 505, 508, 548
See application file for complete search history.

(56) References Cited

U.S. PATENT DOCUMENTS 1,407,714 A * 2/1922 Whitcomb ..................... 277/490
1,774,002 A * 8/1930 Hardy ............................ 277/489
(Continued)

FOREIGN PATENT DOCUMENTS

AT            505293      12/2008
DE       102008037746      2/2010
(Continued)

OTHER PUBLICATIONS

International Search Report for International Application No. PCT/EP2011/065054 mailed Feb. 3, 2012.

*Primary Examiner* — Kristina Fulton
*Assistant Examiner* — Nicholas L Foster
(74) *Attorney, Agent, or Firm* — Pearl Cohen Zedek Latzer Baratz LLP

(57) ABSTRACT

The seal arrangement (1) for piston compressors comprises a deformable ring support (2) and a first and a second endless sealing ring (3a, 3b), wherein the ring support (2) has a longitudinal axis (L) which extends perpendicularly with respect to its circumferential direction, and wherein the ring support (2) has a gap (2i) with play in its circumferential direction, and wherein each sealing ring (3a, 3b) has a longitudinal axis (3c, 3d) which extends perpendicularly with respect to its circumferential direction, and wherein the sealing rings (3a, 3b) are arranged in such a way that the ring support (2) encloses them from the outside, and wherein the two sealing rings (3a, 3b) are arranged next to one another in the direction of extent of the longitudinal axis (L), and wherein the ring support (2) and the sealing rings (3a, 3b) are designed to be adapted to one another in such a way that the first sealing ring (3a) bears on one side against a first side wall (2d) of the ring support (2) and forms a first gap (S1) to the ring support (2) on the opposite side with regard to the longitudinal axis (3c) of the first sealing ring (3a), and wherein the second sealing ring (3b) bears in a diametrically opposed manner on one side against a second side wall (2l) of the ring support (2) and forms a second gap (S2) to the ring support (2) on the opposite side with regard to the longitudinal axis (3d) of the second sealing ring (3b), wherein the first and second side walls (2d, 2l) are arranged so as to lie opposite one another with regard to the longitudinal axis (L), with the result that the ring support (2) can in each case bring about a prestressing force (5a, 5b) on the first and second sealing rings (3a, 3b) respectively via the first and second side walls (2d, 2l) respectively, wherein the prestressing forces (5a, 5b) extend in an opposed manner.

29 Claims, 10 Drawing Sheets

(51) Int. Cl.
*F16J 9/22* (2006.01)
*F16J 9/06* (2006.01)
*F04B 53/14* (2006.01)
*F04B 39/04* (2006.01)
*F16J 15/24* (2006.01)
*F16J 15/26* (2006.01)
*F16J 15/28* (2006.01)
*F16J 15/32* (2006.01)
*F16J 15/56* (2006.01)
*F16J 15/18* (2006.01)
*F16J 9/28* (2006.01)

(52) U.S. Cl.
CPC ............... *F16J9/28* (2013.01); *F04B 53/143* (2013.01); *F04B 39/042* (2013.01); *F16J 15/24* (2013.01); *F16J 15/26* (2013.01); *F16J 15/28* (2013.01); *F16J 15/3272* (2013.01); *F16J 15/56* (2013.01); *F16J 9/16* (2013.01)
USPC ........................... 277/490; 277/489; 277/491

(56) References Cited

U.S. PATENT DOCUMENTS

| | | | | |
|---|---|---|---|---|
| 1,917,639 | A | * | 7/1933 | Evans ............... 92/200 |
| 3,658,348 | A | * | 4/1972 | Nink ............... 277/500 |
| 3,711,104 | A | | 1/1973 | Henry |
| 3,999,767 | A | | 12/1976 | Sievenpiper |
| 5,347,915 | A | * | 9/1994 | Feistel ............... 92/258 |
| 2009/0289422 | A1 | | 11/2009 | Lindner-Silwester |

FOREIGN PATENT DOCUMENTS

| | | |
|---|---|---|
| EP | 1798454 | 6/2007 |
| JP | 57009359 | 1/1982 |
| NL | 7202363 | 9/1972 |
| WO | WO 90/05256 | 5/1990 |
| WO | WO 97/00394 | 1/1997 |
| WO | WO 97/00396 | 1/1997 |
| WO | WO2010017880 | 2/2010 |

* cited by examiner

US 8,985,588 B2

SEAL ARRANGEMENT

CROSS-REFERENCE TO RELATED APPLICATIONS

This application is a National Phase Application of PCT International Application No. PCT/EP2011/065054, International Filing Date Aug. 31, 2011, claiming priority of European Patent Application No. 10174738.4, filed Aug. 31, 2010, which is hereby incorporated by reference.

FIELD OF THE INVENTION

The invention relates to a seal arrangement for piston compressors.

BACKGROUND OF THE INVENTION

It is known to seal the piston rod of crosshead piston compressors movably supported in an oscillating manner with the aid of dry-running or lubricated friction sealing elements. The seal along the piston rod takes place via so-called packings which are usually structured in the form of a serial connection of single-part or multipart sealing elements.

The different variants of packings with seal arrangements can roughly be divided into seal arrangements with single-part sealing rings and with multipart sealing rings.

Document WO 97/00397 discloses a multipart sealing ring which comprises three segments. These segments are subject to wear during operation, with the segmentation of the sealing ring having the consequence that the contact pressure of the segments on the piston rod, and thus the sealing effect, is maintained up to a predefined wear limit despite the wear thanks to a self-adjustment of the segments. Such a multipart sealing ring thus has a wear compensation in that the segments are automatically displaced in dependence on the wear.

Document WO 97/00396 discloses a single-part sealing ring which is suitable as a piston rod seal arrangement. This sealing ring includes an individual single-part ring having a ring gap. With this sealing ring, the wear compensation takes place by an elastic and/or plastic deformation of the sealing ring.

The sealing rings of a piston rod packing are pressed toward the piston rod by a coil spring, for example, in the unloaded state. An additional pressing of the sealing ring toward the piston rod takes place by the differential pressure applied to the sealing ring during the operation of the compressor. In particular with segmented sealing rings, but also with single-part sealing rings with a ring gap, the changing pressure engaging at the sealing ring effects an elastic and/or plastic deformation of the sealing ring or of the individual segments, which has the consequence, among other things, of an unequal material removal along the periphery of the sealing ring. These effects in particular occur with seal arrangements arranged directly toward the sealing space since these seal arrangements are usually loaded with a pressure difference fluctuating over time. The load has the consequence that this seal arrangement has a rapidly decreasing sealing effect and that a flow or a break failure of the seal arrangement respectively occurs in dependence on the material used for the sealing rings.

Known seal arrangements thus have the disadvantage that they may have a rapidly decreasing sealing effect or a relatively high wear under certain circumstances.

SUMMARY OF THE INVENTION

It is the object of the invention to form an economically more advantageous seal arrangement.

This object is satisfied by a seal arrangement having the features of the claims that follow.

The object is in particular satisfied by a seal arrangement comprising a deformable ring carrier as well as comprising a first and a second continuous sealing ring, wherein the ring carrier has a longitudinal axis extending perpendicular to its peripheral direction, and wherein the ring carrier has a gap with clearance in its peripheral direction, and wherein each sealing ring has a longitudinal axis extending perpendicular to its peripheral direction, and wherein the sealing rings are arranged such that the ring carrier surrounds them from the outside, and wherein the two sealing rings are arranged next to one another in the direction of extent of the longitudinal axis, and wherein the ring carrier and the sealing rings are designed mutually adapted such that the first sealing ring contacts a first side wall of the ring carrier at the one side and forms a first gap toward the ring carrier at the side disposed opposite with respect to the longitudinal axis of the first sealing ring, and wherein the second sealing ring contacts a second side wall of the ring carrier at the one side in mirror inversion and forms a second gap toward the ring carrier on the side disposed opposite with respect to the longitudinal axis of the second sealing ring, wherein the first and second side walls are arranged disposed opposite with respect to the longitudinal axis so that the ring carrier can effect a respective preload force on the first or second sealing ring respectively via the first or second side walls respectively, wherein the preload forces extend in an opposite manner, in particular in the direction of extent of the incision.

The object is further in particular satisfied by a seal arrangement for piston compressors comprising a deformable ring carrier as well as a continuous first sealing ring, wherein the ring carrier has a longitudinal axis L extending perpendicular to its peripheral direction, and wherein the ring carrier has a gap with clearance in its peripheral direction, and wherein the ring carrier is designed in L shape with a side part extending perpendicular to the longitudinal axis and a surrounding part extending in the direction of the longitudinal axis L, wherein the first sealing ring has a longitudinal axis extending perpendicular to its peripheral direction, and wherein the first sealing ring is arranged in the ring carrier such that the surrounding part surrounds the first sealing ring from the outside, and wherein the first sealing ring is arranged next to the side part and contacting it in the direction of extent of the longitudinal axis, and wherein the ring carrier and the first sealing ring are designed mutually adapted such that when they contact a piston rod, the first sealing ring contacts a first side wall of the ring carrier at the one side and forms a first gap toward the ring carrier at the side disposed opposite with respect to the longitudinal axis of the first sealing ring, wherein the ring carrier has a second side wall which is arranged disposed opposite the first side wall with respect to the longitudinal axis L so that the ring carrier can effect a preload force on the first sealing aligned toward the longitudinal axis L via the first side wall, and wherein a clamping ring surrounds the ring carrier from the outside in the peripheral direction.

It was recognized that the ring gaps required for wear compensation in known seal arrangements have the consequence of instability under the load caused by pressure changes and pressure differences, which has the consequence of an increased wear at the sealing ring and at the total seal arrangement. The seal arrangement in accordance with the invention has the advantage that the actual sealing rings no longer have any ring gaps in that the sealing rings are designed as continuous sealing rings. That is, the sealing ring extends over 360° and does not have any gap or ring gap, but is rather designed in a throughgoing manner over a full circle of 360°. The seal arrangement in accordance with the invention with sealing rings without ring gaps thus has the advantage that the pressure changes and pressure differences engaging at the sealing ring have the consequence of no instability, or only a very small stability, of the sealing ring so that the sealing ring has substantially smaller wear in comparison with known seal arrangements.

To achieve a sealing effect comparable with known friction seal arrangements, the seal arrangement in accordance with the invention for sealing a piston rod of a piston compressor has two continuous sealing rings, with these two sealing rings being arranged next to one another in the direction of extent of the piston rod and being held in a common ring carrier, and with the two sealing rings as well as the ring carrier being designed mutually adapted such that the two sealing rings are supported displaceably in opposite directions in the ruing carrier for wear compensation. The seal arrangement in accordance with the invention thus makes it possible to use two continuous sealing rings for rubbing sealing, with these two sealing rings having war during operation and the ring carrier therefore being designed such that it can carry out wear compensation. In a preferred embodiment, the ring carrier is designed such that it surrounds the two sealing rings such that the two sealing rings are displaceably supported in opposite directions. In a preferred embodiment, the ring carrier has a gap in the peripheral direction, with the ring carrier being formed from a deformable material and being designed as elastically or plastically deformable, which has the consequence that the ring carrier can change its diameter in the radial direction and can thereby effect a force or a displacement on the two sealing rings. In a preferred embodiment, the seal arrangement includes a coil spring or a clamping ring which surrounds the ring carrier at its periphery to effect a force on the sealing rings at least in the unloaded state and thus to ensure that they also remain in contact with the piston rod in the unloaded state.

In an advantageous embodiment, the ring carrier has a ring gap, with the sealing rings being arranged in the ring carrier and being held mutually displaceably such that the direction of displacement of the two sealing rings is aligned orthogonally or perpendicular to the direction of extent of the ring gap.

The contact of the two sealing rings to the movable piston rod as well as the wear compensations of the seal arrangement in accordance with the invention required due to the wear of the sealing rings in which the two sealing rings are displaced in opposite directions has the consequence that each sealing ring only has a rubbing contact with the piston rod over an angle of 180 degrees or substantially 180 degrees and thus only contacts the piston rod periphery along this angle. An asymmetrical material removal thus takes place at each of the two sealing rings, which has the consequence that they move toward tone another during operation or during wear. The ring carrier and the two sealing rings are designed mutually adapted in a particularly advantageous embodiment such that the maximum permitted wear path of the sealing rings is limited, which is possible, for example, by grooves eccentrically worked in the ring carrier. As soon as the point of the maximum permitted wear path has been reached, the ring carrier no longer exerts the forces on the sealing rings acting in opposite directions. As soon as the maximum permitted wear path of the sealing rings has been reached, the sealing function of the seal arrangement thus changes from a friction seal into a gap seal, preferably into a contact-free gap seal.

The seal arrangement in accordance with the invention has, among other things, the advantage that the sealing rings are designed as continuous, that is the sealing rings have no incision or gap, so that the sealing rings have a high stiffness so that the compression forces engaging at the sealing ring effect a smaller deformation, which in turn has the consequence that the wear reduces. In addition, the sealing rings also do not require any elastic or plastic deformability for wear compensation as was required with previously known sealing rings. This allows a seal arrangement with small wear. In the seal arrangement in accordance with the invention, the wear direction of the two sealing rings is predefined by the ring carrier, for example by eccentrically designed grooves which hold the sealing rings so that no security against rotation by a fixing pin is required in the seal arrangement so that the seal arrangement can be designed favorably and reliably.

In a further advantageous embodiment, the ring carrier of the seal arrangement is configured such that the two sealing rings are held in a mutually spaced apart position by the ring carrier in the axial direction in that the ring carrier has a spacer ring which is arranged between the sealing rings. In a particularly advantageous embodiment, the spacer ring is designed such that its inner side comes to lie close to the piston rod or contacts the piston rod and thus likewise exerts a sealing function. If the spacer ring contacts the piston rod, a rubbing contact results along the piston rod in that the first sealing ring has a 180 degree contact to the piston rod, then the spacer ring has a rubbing contact to the piston rod and then the second sealing ring has a 180 degree contact to the piston rod. In this embodiment, the ring carrier has a pressure-relieving function for the sealing rings. In addition, the sealing rings are guided in a lateral direction by the spacer ring.

The sealing rings are preferably produced from dry-running materials such as filled PTFE or polymer blends modified specifically for dry running or high-temperature polymers such as PEEK or PI as well as special sintered bronze. For use in oil-free piston compressors, the sealing rings comprise, for example, filled plastics and composites or also metals such as lead bronze or tin bronze. The ring carrier is preferably produced from a plastic such as PEEK. If the ring carrier has a contact with the piston rod, a modified plastic containing solid lubricants such as graphite or PTFE is preferably suitable.

The invention will be explained in detail in the following with reference to embodiments.

BRIEF DESCRIPTION OF THE DRAWINGS

The drawings used to illustrate the embodiments show.

Generally, the same parts are provided with the same reference numerals in the drawings.

DETAILED DESCRIPTION OF THE INVENTION

Figure 1:
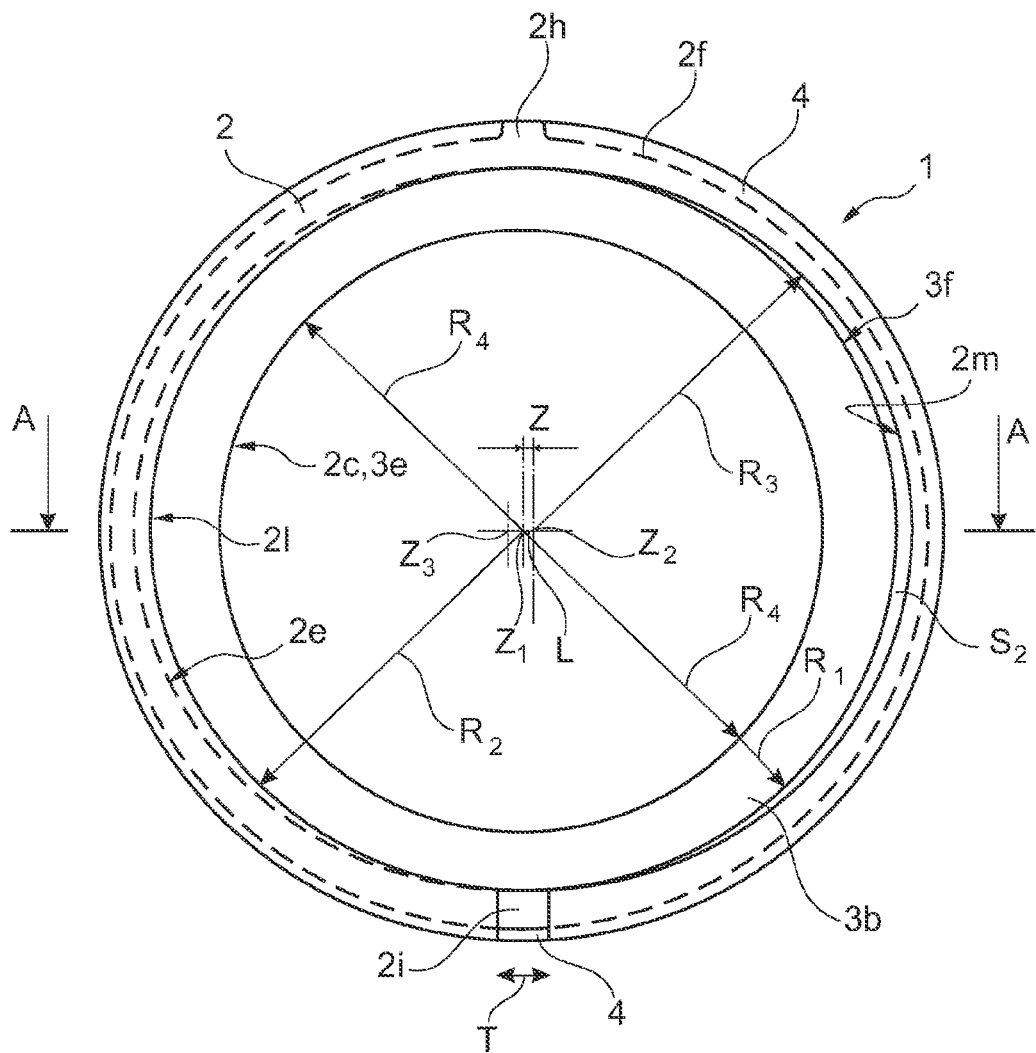
FIG. 1 a front view of a seal arrangement.
Figure 2:
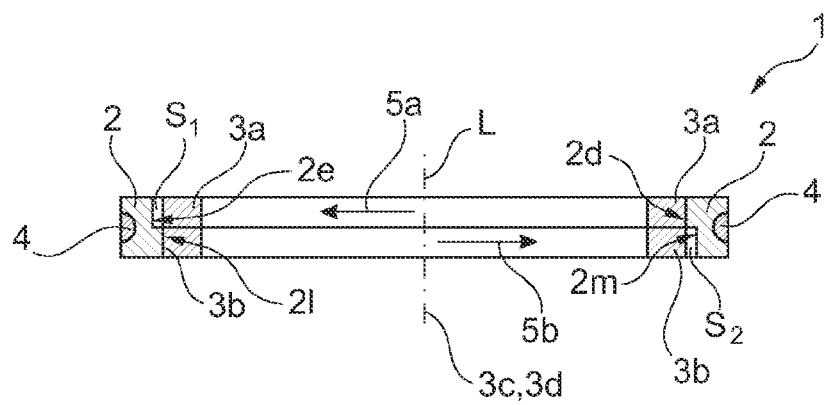
FIG. 2 a section of FIG. 1 along the line A-A.

FIG. 1 shows a seal arrangement 1 in a plan view and in a section along the line A-A in FIG. 2 comprising an elastically or plastically deformable ring carrier 2 and a first and a second sealing ring 3a, 3b which are arranged in the ring carrier 2. A continuous sealing ring is understood as a ring extending over 360° which thus has not gap or no ring gap site respectively. The ring carrier 2 has a longitudinal axis L extending perpendicular to its peripheral direction. The ring carrier 2 additionally has a gap 2i with clearance T in its peripheral direction. Each sealing ring 3a, 3b has a longitudinal axis 3c, 3d extending perpendicular to its peripheral direction. The sealing rings 3a, 3b are arranged such that the ring carrier 2 surrounds them from the outside, with the two sealing rings 3a, 3b being arranged lying directly next to one another in the direction of extent of the longitudinal axis L, as can be seen from FIG. 2. The ring carriers 2 and the sealing rings 3a, 3b are in a new state, that is are designed mutually adapted without any wear or only with little wear and contacting a piston rod 6 such that the first sealing ring 3a contacts a first side wall 2d of the ring carrier 2 at the one side and forms a first gap Si toward the ring carrier 2 at the side disposed opposite with respect to the longitudinal axis 3c of the first sealing ring 3a and such that the second sealing ring 3b contacts a second side wall 21 of the ring carrier 2 in mirror inversion at the one side and forms a second gap S2 toward the ring carrier 2 at the side disposed opposite with respect to the longitudinal axis 3d of the second sealing ring 3b, wherein the first and second side walls 2d, 21 are arranged disposed opposite with respect to the longitudinal axis L so that the ring carrier 2 can effect a respective preload force 5a, 5b on the first or second sealing ring 3a, 3b respectively via the first or second side walls 2d, 21, wherein the preload forces 5a, 5b extend in opposite directions in the direction of extent of the section A shown in FIG. 2. The previously described arrangement of the ring carrier 2 and of the two sealing rings 3a, 3b in particular applies in the new state and as long as the sealing rings 3a, 3b have no wear or only small wear. In the new state, the sealing rings 3a, 3b are arranged in a starting position along a piston rod 6, with the two sealing rings 3a, 3b preferably being arranged contacting the piston rod 6 such that the longitudinal axes 3c, 3c extend identically. In the embodiment shown, the ring carrier 2 has a cut-out 2f in which a clamping ring 4 is arranged and which surrounds the ring carrier 2. The ring carrier 2 has a web 2h to prevent a rotation of the clamping ring 4 with respect to the ring carrier 2.

The seal arrangement 1 shown in FIGS. 1 and 2 shows the ring carrier 2 designed as a ring shaped body with a gap 2i. The view in accordance with FIG. 1 in particular shows the second sealing ring 3b and the ring carrier 2 surrounding it, with the second sealing ring 3b having an inner radius R and an outer radius R1. The ring carrier 2 has side walls at its inner side which are designed such that they effect the oppositely acting preload forces 5a, 5b on the first or second sealing ring 3a, 3b respectively, with the clamping ring 4 exerting a preload force on the ring carrier 2. In the view shown in accordance with FIG. 1, the ring carrier 2 has, on the inner side shown at the left, a second side wall 21 extending in a semicircular manner and having a center Z1 and a radius R2. In addition, the ring carrier 2 has, at the inner side shown at the right, a second spaced apart side wall 2m extending in a semicircular manner and having a center Z2 and a radius R3, with the radii R2 and R3 being identical in the embodiment shown. The two centers Z1 and Z2 are mutually spaced apart by a distance Z, with the distance Z being able to have a value between 0.1 and 10 mm depending on the embodiment of the ring carrier 2 or depending on the maximum permitted wear of the sealing rings 3a, 3b. To hold the first sealing ring 3a arranged at the rear from the view in accordance with FIG. 1, the ring carrier 2 has, as can be seen from FIGS. 1 and 2, a first side wall 2d designed in mirror inversion with respect to the second side wall 21 and the second spaced apart side wall 2m and a first spaced apart side wall 2e such that the first side wall 2d is of semicircular design and has a center Z1 and a radius R2 and such that the first spaced apart side wall 2e is of semicircular design and has a center Z3 and a radius R3, with the radii R2 and R3 again being identical in the embodiment shown. The two centers Z1 and Z3 are in turn mutually spaced apart by the distance Z. The continuous sealing ring 3a, 3b has an inner radius R.

Figure 3:
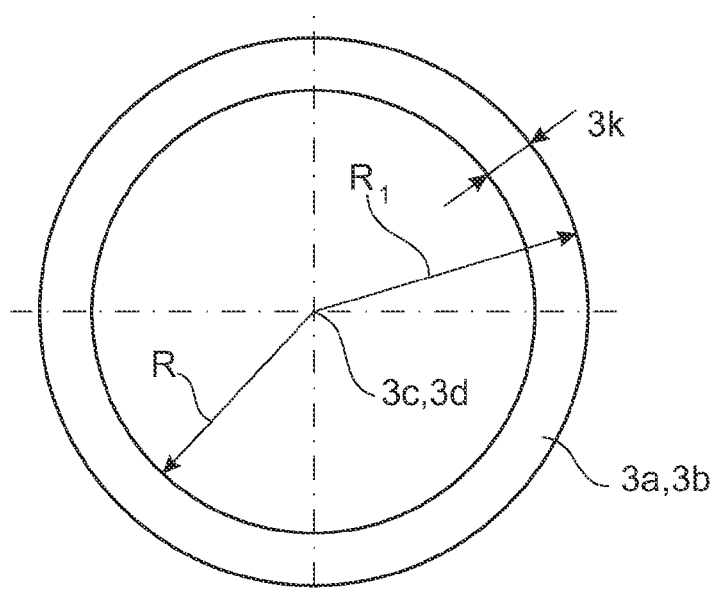
FIG. 3 a sealing ring.
Figure 4:
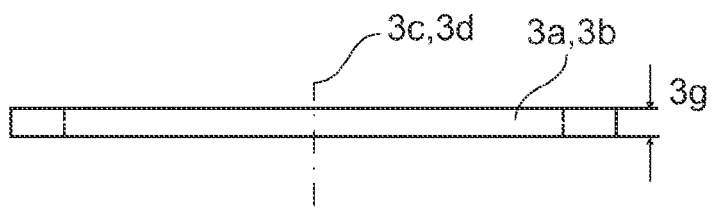
FIG. 4 a side view of the sealing ring in accordance with FIG. 3.

FIG. 3 shows in a plan view the continuous sealing ring 3a or 3b with a center axis 3c, 3d, an inner radius R, an outer radius R1 and a ring width 3k. FIG. 4 shows the continuous sealing ring 3a, 3b with a width 3g in a side view.

Figure 5:
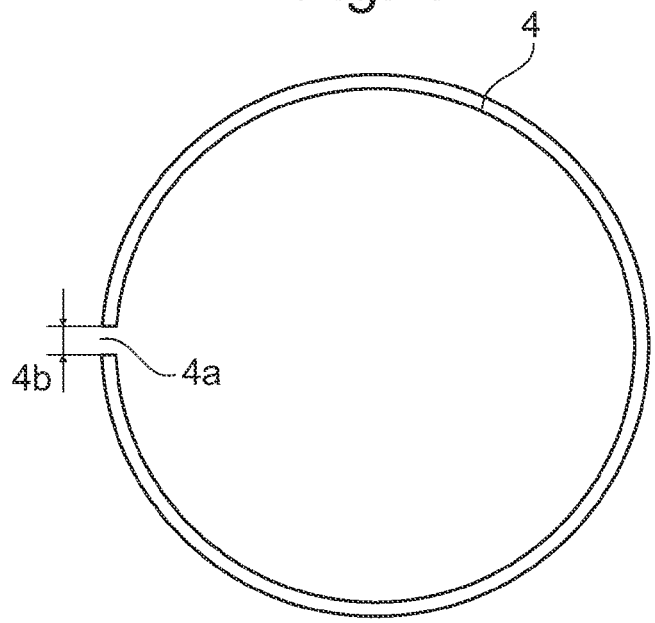
FIG. 5 a clamping ring.

FIG. 5 shows the clamping ring 4 with a gap 4a and a gap width 4b in a plan view.

Figure 6:
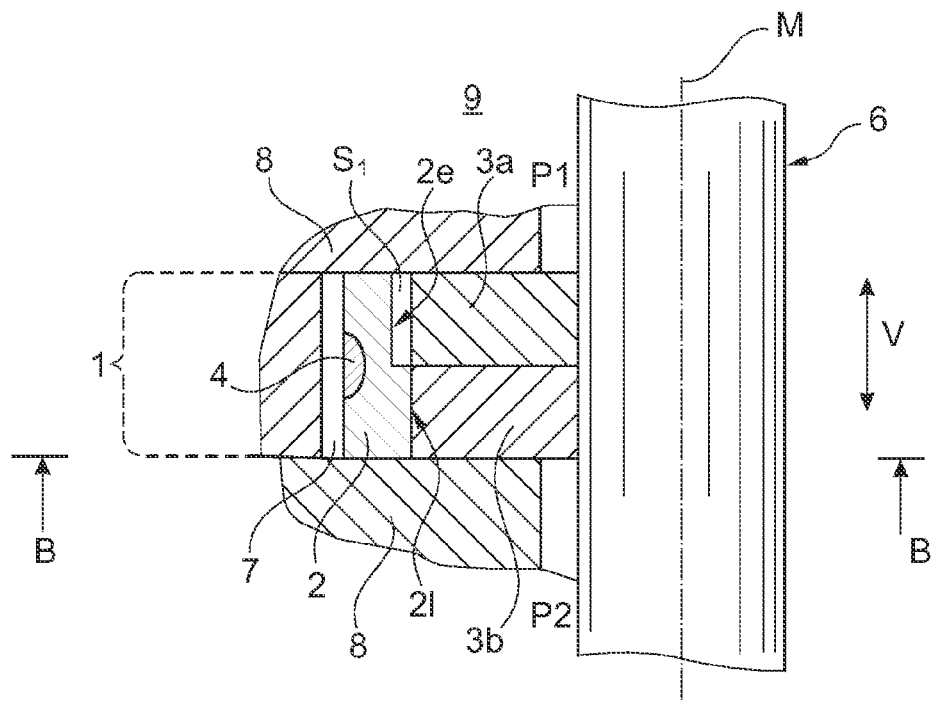
FIG. 6 a seal arrangement arranged at a piston rod.

FIG. 6 shows a piston rod 6 movable in a direction of movement v and having a longitudinal axis M. In addition, FIG. 6 shows the left half of a seal arrangement 1 in a part longitudinal section, said seal arrangement being arranged in a chamber ring 8 having a sealing chamber 7, with P1 representing the side with higher pressure and P2 the side with lower pressure. FIG. 6 shows a similar seal arrangement 1 as shown in FIGS. 1 and 2, with the seal arrangement 1 shown in FIG. 6 likewise being in a new state. The design and the operation of this seal arrangement 1 was has already been described with the aid of FIG. 2.

Figure 7:
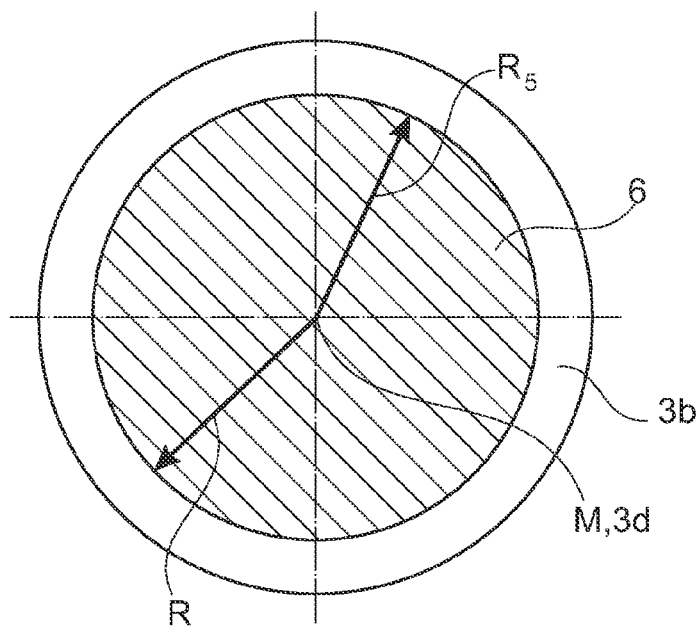
FIG. 7 a section through a piston rod with a sealing ring arranged thereat along the line B-B.

FIG. 7 shows a section through a piston rod 6, for example along the line B-B in accordance with FIG. 6, with a sealing ring 3b in the new state contacting the piston rod 6. The longitudinal axis M of the piston rod 6 extends identically or almost identically with the center axis 3d of the sealing ring 3b. The inner radius R of the sealing ring 3b is larger than or equal to the radius R5 of the piston rod.

Figure 8:
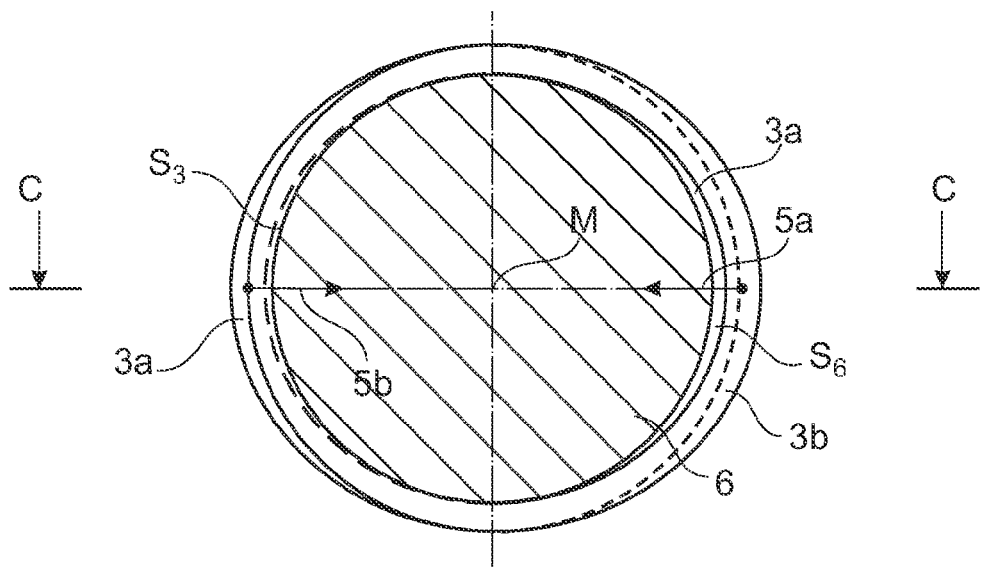
FIG. 8 a section through a piston rod, with the sealing rings having wear.
Figure 9:
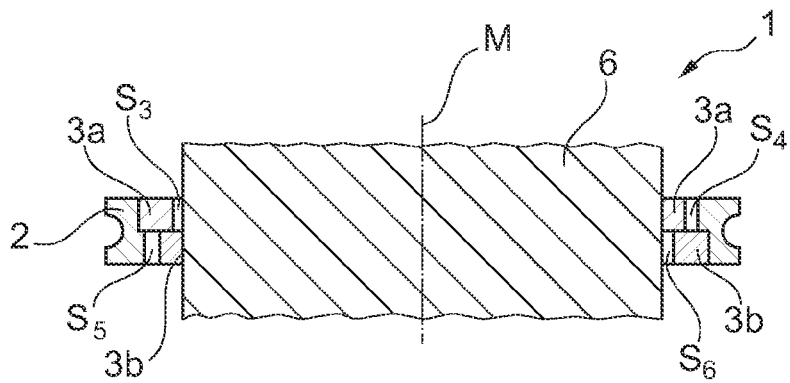
FIG. 9 a section through FIG. 8 along the line C-C.

FIG. 8 shows the view shown in FIG. 7 after a certain operating time during which the sealing rings 3a, 3b are subject to wear. The preload force 5b acting on the second sealing ring 3b has the consequence that the second sealing ring 3b wears at the inner surface of the left side in the representation in accordance with FIG. 8, with this inner surface contacting the surface of the piston rod 6 so that a gap S6 is formed on the right side between the piston rod 6 and the second sealing ring 3b. The first sealing ring 3a undergoes wear in mirror inversion with respect to the second sealing ring 3b, for example, and therefore carries out a movement in mirror inversion in the direction of the preload force 5a so that a gap S3 is formed between the piston rod 6 and the first sealing ring 3a. FIG. 9 shows a section along the line C-C shown in FIG. 8, with in addition in FIG. 9 the ring carrier 2 being shown which surrounds the first and second sealing rings 3a, 3b. The wear of the first and second sealing rings 3a, 3b has the consequence that the gaps S3, S4, S5 and S6 are formed, with the seal arrangement 1, as can be seen from FIG. 9, having an excellent sealing effect despite these gaps S3, S4, S5 and S6 in the longitudinal direction M of the piston rod 6. In FIG. 9, the first and second sealing rings 3a, 3b have reached the maximum wear path, which can be recognized from the fact that the first sealing ring 3a contacts the ring carrier 2 at the left in the shown view and thus can no longer be displaced further to the left. In mirror inversion to this, the second sealing ring 3b contacts the ring carrier 2 at the right and can thus also no longer be displaced further to the right. As soon as the sealing rings 3a, 3b have reached the maximum possible wear path, the sealing function of the seal arrangement 1 changes from a friction sealing into a gap seal, preferably into a contact-free gap seal.

Figure 10:
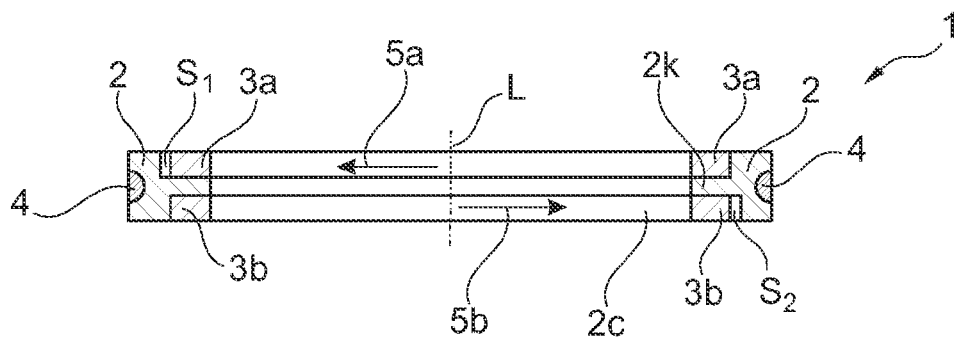
FIG. 10 a section through a further seal arrangement.

FIG. 10 shows a further embodiment of a seal arrangement 1 in a section. Unlike the seal arrangement 1 shown in FIG. 2, the seal arrangement 1 in accordance with FIG. 10 has a ring carrier 2 with a ring part 2k which is designed as an intermediate wall and which the two sealing rings 3a, 3b contact so that the two sealing rings 3a, 3b are arranged mutually spaced apart in the direction of the longitudinal axis L. The ring part 2k is also called a spacer ring 2k.

Figure 11:
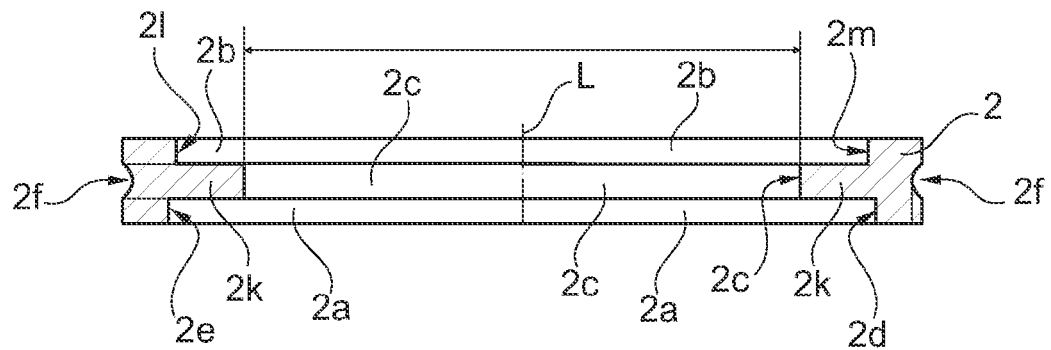
FIG. 11 a section through a ring carrier along the line D-D.
Figure 12:
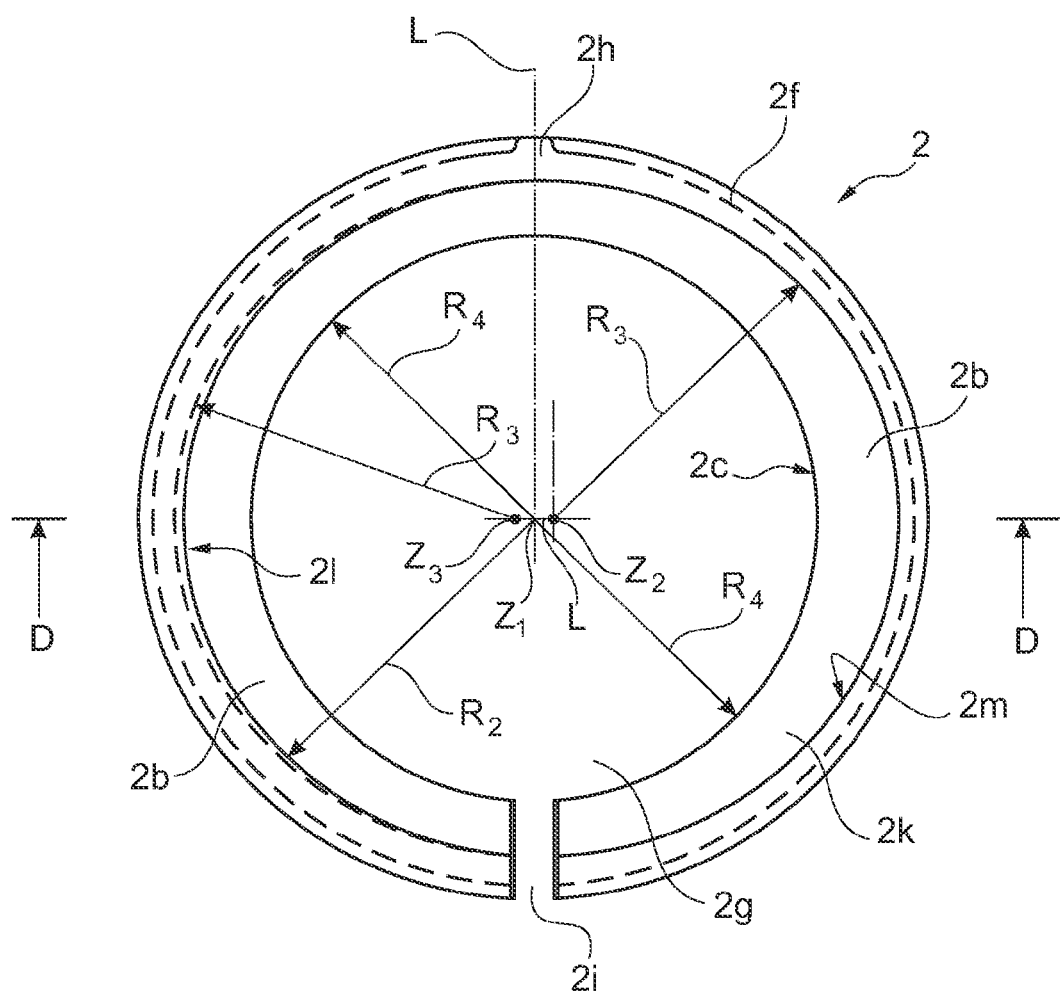
FIG. 12 a front view of the ring carrier shown in FIG. 11.

FIG. 12 shows a plan view of a similar ring carrier 2 to that shown in FIG. 10. FIG. 11 shows a section along the line D-D in accordance with FIG. 12. The ring carrier 2 has a cut-out 2a for the first sealing ring 3a as well as a cut-out 2b for the second sealing ring 3b. The ring carrier 2 in addition has a ring gap 2k or an intermediate web 2k having a cut-out 2c for the piston rod 6, with the cut-out as shown preferably having a surface aligned toward the piston rod 6, with the ring part 2k preferably being designed such that a gap forms between the ring part 2k and the piston rod 6 so that a gap seal is formed. In a preferred embodiment, the intermediate web 2k has an inner diameter R4 which substantially corresponds to the inner diameter R of the first and second sealing rings 3a, 3b. The extent of the grooves for receiving the first and second sealing rings 3a, 3b is designed identical to that shown in FIG. 1 in that the cut-out 2b for the second sealing ring 3b has a second side wall 21 which extends in a semicircular manner and has a radius of curvature R2 and a center Z1 as well as a spaced apart side wall 2m extending in a semicircular manner and having a radius of curvature R3 and a center Z2. The cut-out 2a for the first sealing ring 3a is designed in mirror inversion to this and has a first side wall 2d extending in a semicircular manner and having a radius of curvature R2 and a center Z1 as well as a side wall 2e spaced apart and extending in a semicircular manner and having a radius of curvature R3 and a center Z3, with the centers Z3 and Z2 having the same spacing with respect to the center Z1. Due to this arrangement of the sealing rings 3a, 3b in the ring carrier 2, as described in FIGS. 1 and 2, a preload force 5a, 5b on the sealing rings 3a, 3b is effected so that the sealing rings 3a, 3b move relative to the ring carrier 2 due to the wear occurring over time, as shown in FIGS. 8 and 9. The ring part 2k inter alia has the advantage that it forms as supporting side surface for the sealing ring 3a, 3b so that it is guided better on engaging changing loads.

In addition, the ring part 2k can form a gap seal together with the piston rod 6 in the longitudinal direction L.

Figure 13:
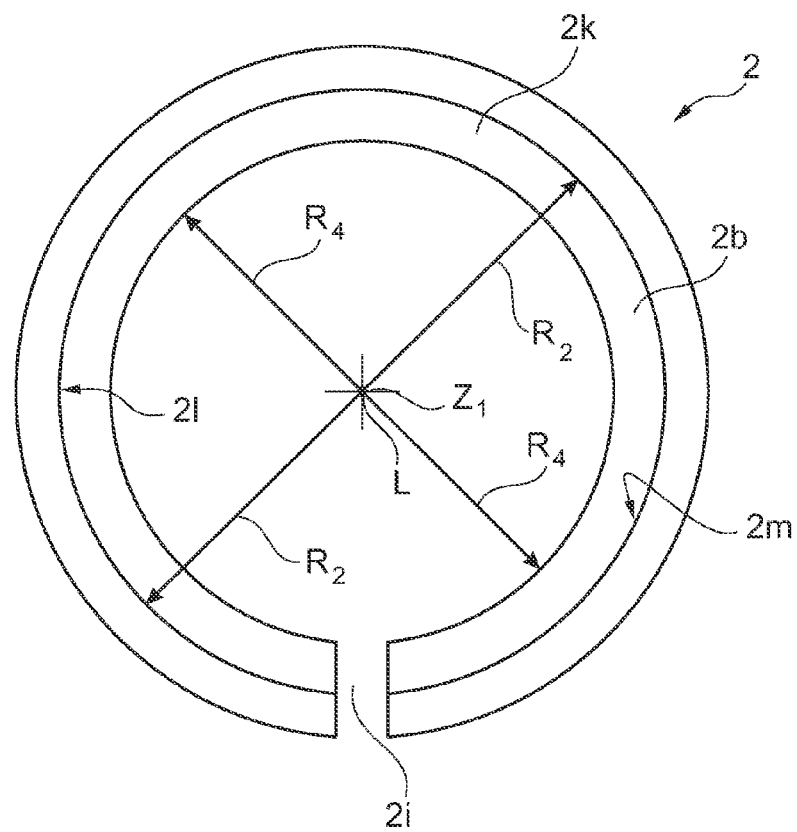
FIG. 13 a front view of a further ring carrier.
Figure 14:
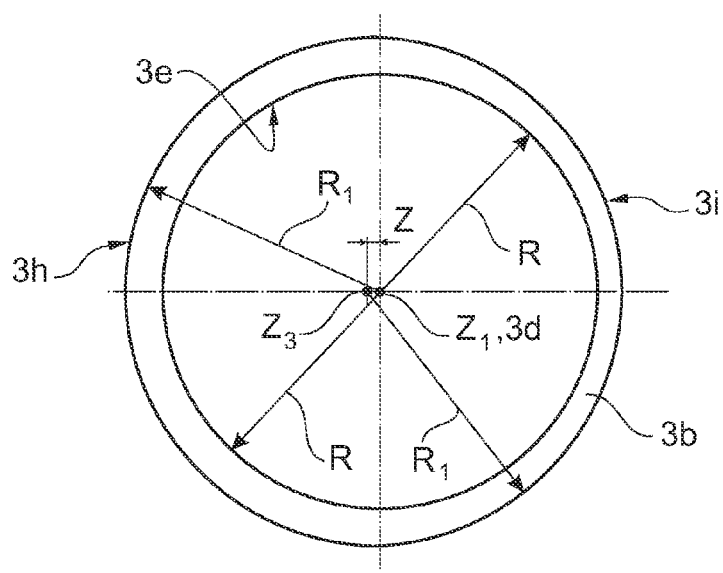
FIG. 14 a sealing ring for the ring carrier shown in FIG. 13.

FIG. 13 shows a further embodiment of a ring carrier 2 with a ring part 2k with an inner diameter R4. FIG. 14 shows a second sealing ring 3b adapted to this ring carrier 2 and having an inner radius R. Unlike the embodiment shown in FIG. 12, the ring carrier 2 shown in FIG. 13 has a cut-out 2b with a circular side wall with a center Z1 and a radius R2 so that the second side wall 21 and the spaced apart side wall 2m extend in a circular manner with the same center Z1. So that the second sealing ring 3b can nevertheless be displaced in the cut-out 2b of the ring carrier 2, as described in FIGS. 1 and 2, the second sealing ring 3b is designed as shown in FIG. 14. The second sealing ring 3b has a first, semicircular outer surface 3h with a center Z1 and a radius R1. The second sealing ring 3b in addition has a second, semicircular outer surface 3i with a center Z3 and a radius R1. The two centers Z1 and Z3 are mutually spaced apart by the distance Z. The second sealing ring 3b thus has a smaller width on the right side in FIG. 14, which has the consequence that this sealing ring 3b, arranged in the cut-out 2b of the ring carrier 2 shown in FIG. 13, has a gap S2 in the new state between the spaced apart side wall 2m of the ring carrier 2 and the second semicircular outer surface 3i. The first sealing ring 3a is of exactly the same design as the second sealing ring 3b shown in FIG. 14, with the first sealing ring 3a being arranged in mirror inversion to the second sealing ring 3b in the ring carrier 2 shown in FIG. 13 such that in the new state as shown in FIG. 2, for example, a gap S1 forms on the left side.

Figure 15:
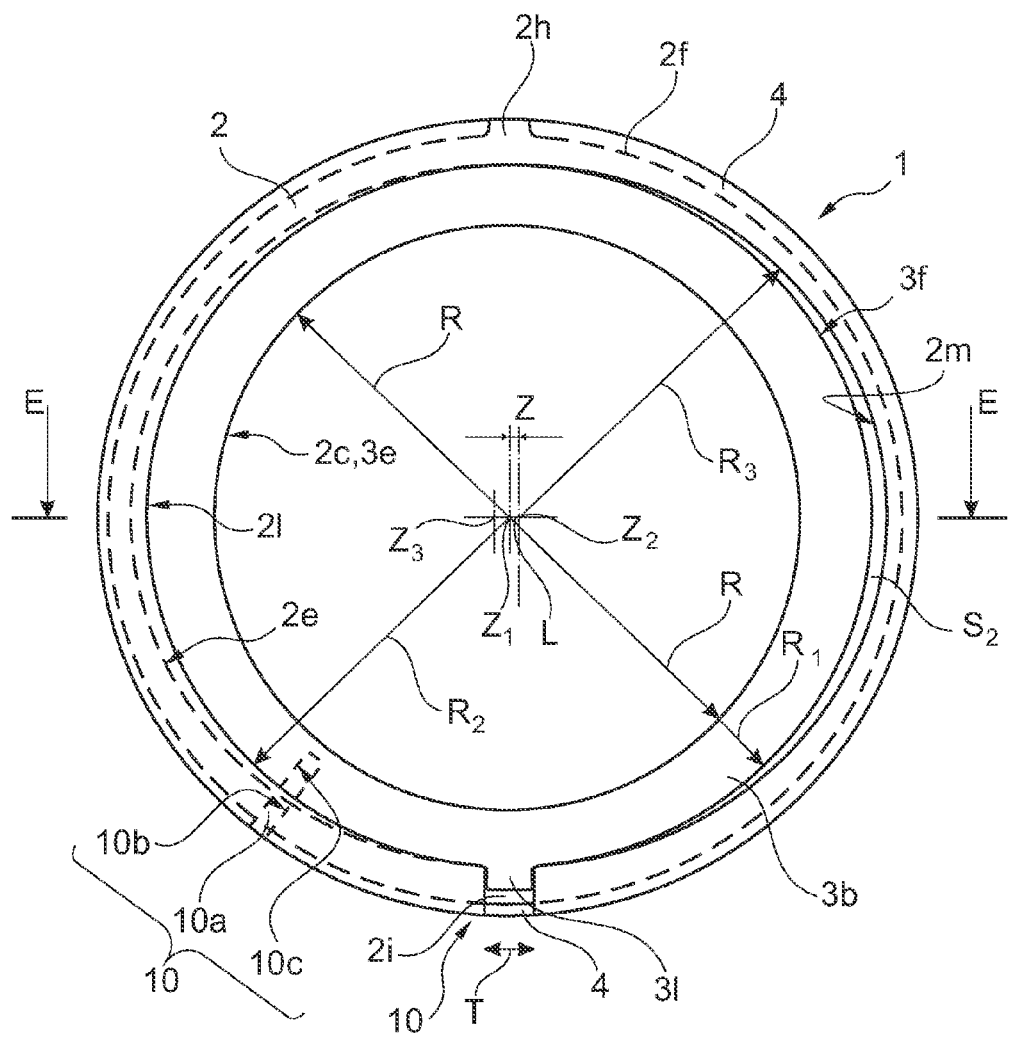
FIG. 15 a front view of a further seal arrangement.

The ring carrier 2 and/or the sealing ring 3a, 3b in the embodiment shown in FIGS. 13 and 14 advantageously has/have a security against rotation 10, for example a pin, to fix the position of the sealing ring 3a, 3b with respect to the ring carrier such that no mutual rotation occurs. Further embodiments of securities against rotation 10 are shown in FIG. 15.

FIGS. 12 and 13 each show a ring carrier 2 with a ring part 2k or an intermediate web 2k. The ring carrier 2 shown in FIG. 13 could, however, also be designed without an intermediate web 2k so that two sealing rings 3b, 3a designed in accordance with FIG. 14 could be held in the ring carrier 2 in manner similar to that shown in FIG. 2.

The side walls 21, 2m of the cut-outs 2a, 2b in the ring carrier 2 intended to receive the first and second sealing rings 3a, 3b and the outer surface 3h, 3i of the sealing rings 3a, 3b can be designed mutually adapted in a plurality of possibilities such that the sealing ring 3a, 3b is displaceably supported in the ring carrier 2 in the direction of extent of the engaging preload force 5a, 5b. The side walls 21, 2m and/or the outer surface 3h, 3i can also be designed as a frequency polygon or as a polygon, for example, or could also extend in an oval manner, for example.

The ring carrier 2 and the sealing rings 3a, 3b are preferably designed mutually adapted such that the first and/or the second gap S1, S2 has/have a maximum width in the new state in the range from 0.1 mm to 10 mm, and preferably a maximum width in the range from 1 mm to 2 mm.

The sealing rings 3a, 3b are preferably composed of a wearable material, in particular of a metal such as bronze, gray cast iron or sintered iron or of a plastic such as PEEK, filled PTFE or hollow temperature polymers such as PEEK, PI or epoxy. The ring carrier 2 is composed of a metal, in particular of steel, stainless steel, bronze or gray cast iron or of a plastic, in particular PEEK, filled PTFE or high-temperature polymers such as PEEK, PI or epoxy.

A plurality of seal arrangements 1 can be arranged lying behind one another in the direction of extent of seal arrangements 1.

FIG. 15 shows a further seal arrangement 1 which is designed the same per se as the seal arrangement shown in FIG. 1 with the exception that the seal arrangement 1 in accordance with FIG. 15 has a security against rotation 10 which is designed such that it prevents a rotation of the first sealing ring 3a and/or of the second sealing ring 3b with respect to the ring carrier 2. The section along the line E-E is identical to the section shown in FIG. 2. The security against rotation 10 can be designed in different embodiments. In an embodiment shown in FIG. 15, the security against rotation 10 is configured such that the first sealing ring 3a and/or the second sealing ring 3b has/have a projecting nose 31 and such that the nose 31 is designed as so wide in the peripheral direction of the sealing ring 3a, 3b that the nose 31 has room in the gap 2i of the ring carrier 2 so that the nose 31 together with the gap 2i formed by the ring carrier 2 forms the security against rotation 10 to prevent a rotation of the first and/or second sealing rings 3a, 3b with respect to the ring carrier 2. The view shown in FIG. 15 shows only the second sealing ring 3b. In a preferred embodiment, the first sealing ring 3a could likewise have a nose 31 which projects into the gap 2i to effect a security against rotation 10. FIG. 15 additionally shows a further embodiment of a security against rotation 10, with it including a pin 10a as well as a bore 10b in the ring carrier 2 and a bore 10c in the first sealing ring 3a and/or in the second sealing ring 3b. The bore 10b, 10c and the pin 10a introduced into the bores 10b, 10c are designed mutually adapted such that a mutual rotation of the ring carrier 2 with respect to the first sealing ring 3a and/or the second sealing ring 3b is prevented.

Figure 16:
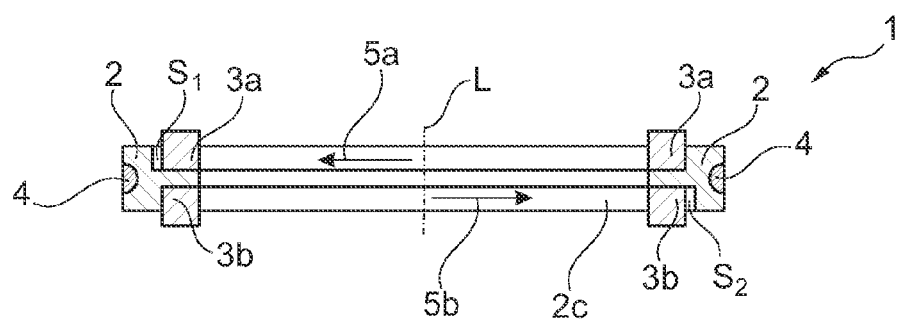
FIG. 16 a section through a further seal arrangement.

FIG. 16 shows a section through a further seal arrangement 1 which has a similar design to the seal arrangement 1 shown in FIG. 10. Unlike the seal arrangement 1 shown in FIG. 10, the first and the second sealing rings 3a, 3b project beyond the ring carrier 2 in the direction of the longitudinal axis L in the seal arrangement 1 shown in FIG. 16. The first and/or second sealing rings 3a, 3b can equally also be designed so wide that they project beyond the ring carrier 2 in the direction of the longitudinal axis L. In a particularly advantageous embodiment, the sealing rings 3a, 3b are not, as shown in FIG. 16, designed wider, but the ring carrier 2 shown in FIG. 9 or 10 is rather designed narrower in the direction of the longitudinal axis L and the width of the sealing rings 3a, 3b is maintained so that it is possible to form a very narrow ring carrier 2.

Figure 17:
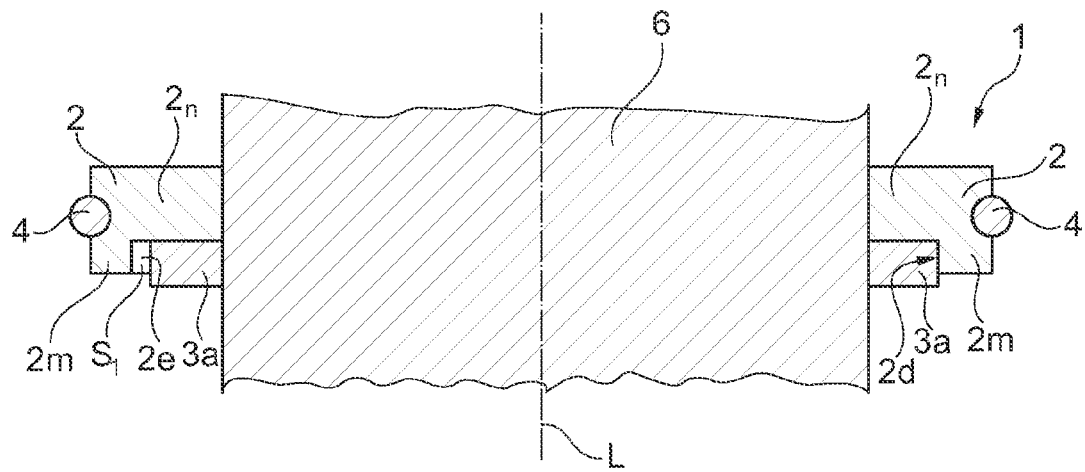
FIG. 17 a section through a piston rod and through a further embodiment of a seal arrangement.
Figure 18:
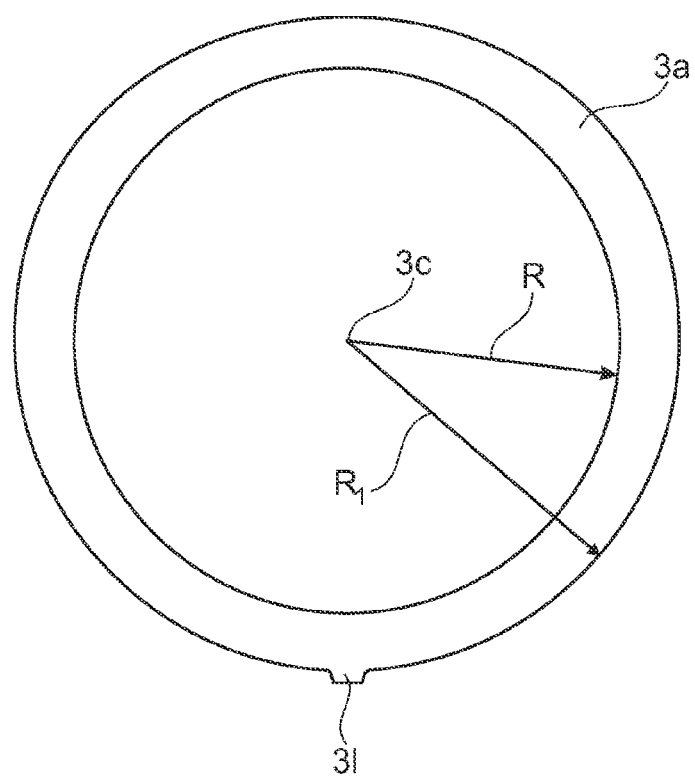
FIG. 18 a sealing ring for the seal arrangement shown in FIG. 17.
Figure 19:
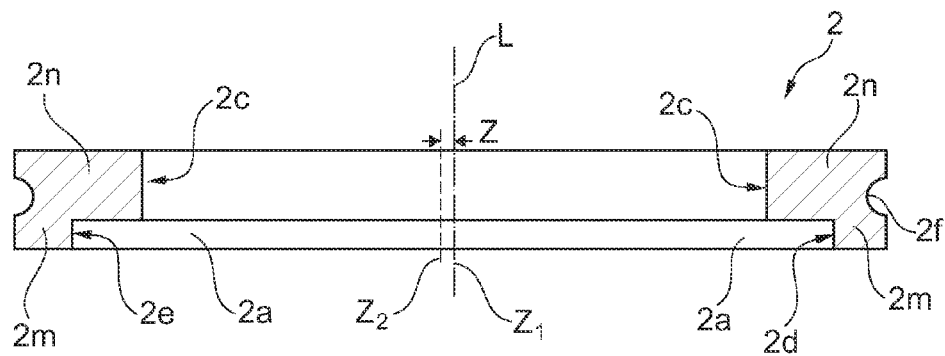
FIG. 19 a section along the line F-F through the ring carrier shown in FIG. 20.
Figure 20:
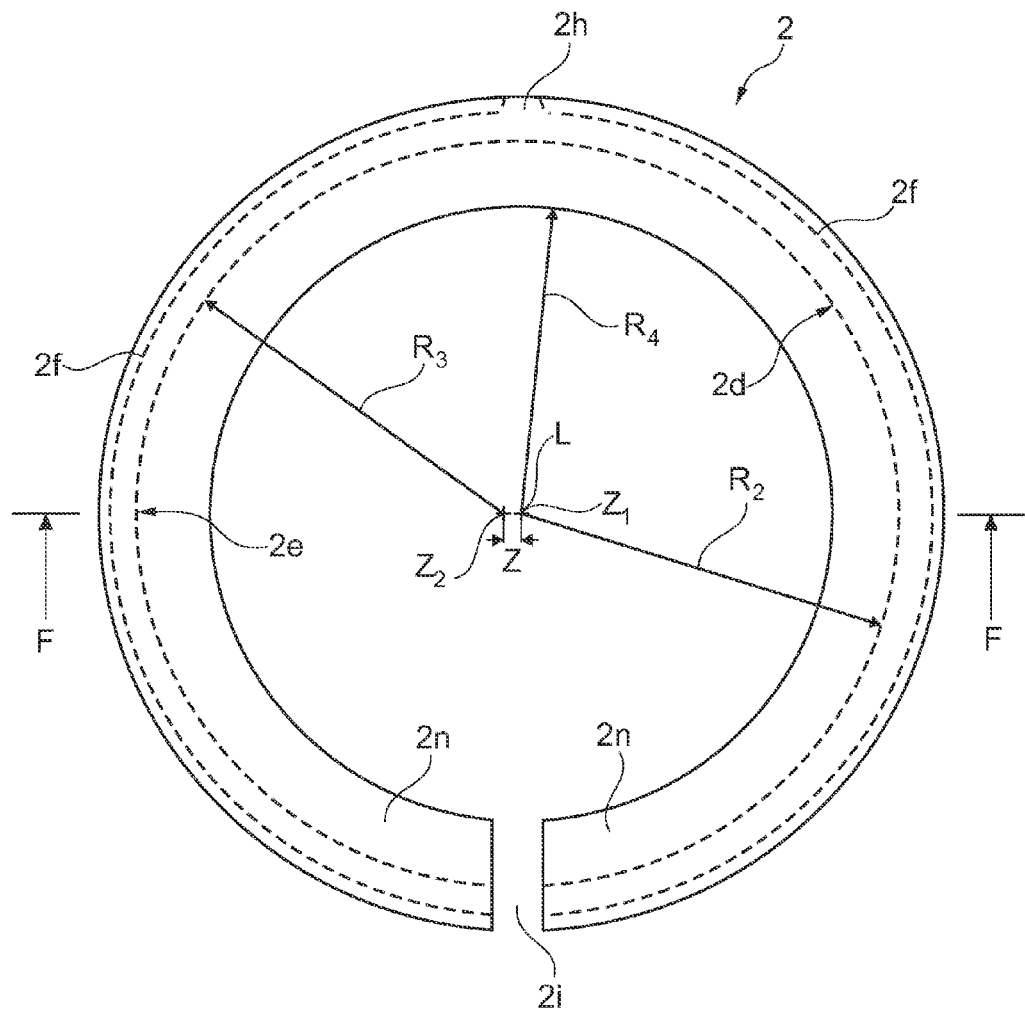
FIG. 20 a front view of the ring carrier shown in FIG. 19.

FIG. 17 shows a further embodiment of a seal arrangement 1 in a longitudinal section. This seal arrangement 1 includes a first sealing ring 3a as well as a ring carrier 2, with the piston rod 6 additionally being shown in section in FIG. 17. A clamping ring 4 surrounds the ring carrier 2 at least in part. FIG. 18 shows a side view of the sealing ring 3a with an inner radius R and an outer radius R1, with the sealing ring 3a additionally having a radially projecting nose 31 in the embodiment shown. FIG. 19 shows the ring carrier 2 in a section which is identical to the section shown in FIG. 17. The ring carrier 2 shown in FIG. 19 has an L-shaped section with a side part 2n extending in the radial direction and a surrounding part 2m extending in the direction of the longitudinal axis L. The side part 2n has a sealing surface 2c which extends in circular form and is aligned toward the piston rod 6. The ring carrier 2 has a cut-out 2a on the one side for receiving the sealing ring 3a. The cut-out 2a includes a first side wall 2d and a spaced apart side wall 2e disposed opposite with respect to the longitudinal axis L. FIG. 20 shows a plan view of the ring carrier 2, with FIG. 19 showing a section along the line F-F. The ring carrier 2 has a gap 2i extending in the peripheral direction. The ring carrier 2 additionally has a web 2h. The ring carrier 2 includes a first center Z1, with a semicircle with a radius R2 defining the first side wall 2d. The ring carrier 2 includes a second center Z2 which is spaced apart by the distance Z with respect to the first center Z1. A semicircle about the second rotational center Z2 with a radius R3 defines the spaced apart side wall 2e. The ring carrier 2 additionally includes an outwardly peripheral cut-out 2f for a clamping ring 4 which could be designed as shown in FIG. 5, for example. This clamping ring 4 effects a force extending in the peripheral direction, with the ring carrier 2 being designed as deformable, in particular elastically deformable, so that the ring carrier 2, as shown in FIG. 17, contacts the piston rod 6 in the peripheral direction. The spaced apart side wall 2e is designed such that a first gap S1 arises between the sealing ring 3a and the spaced apart side wall 2e at least with a new, not yet worn seal arrangement 1. The width of the gap S1 reduces as the wear of the sealing ring 3a and/or of the ring carrier 2 increases.

Figure 21:
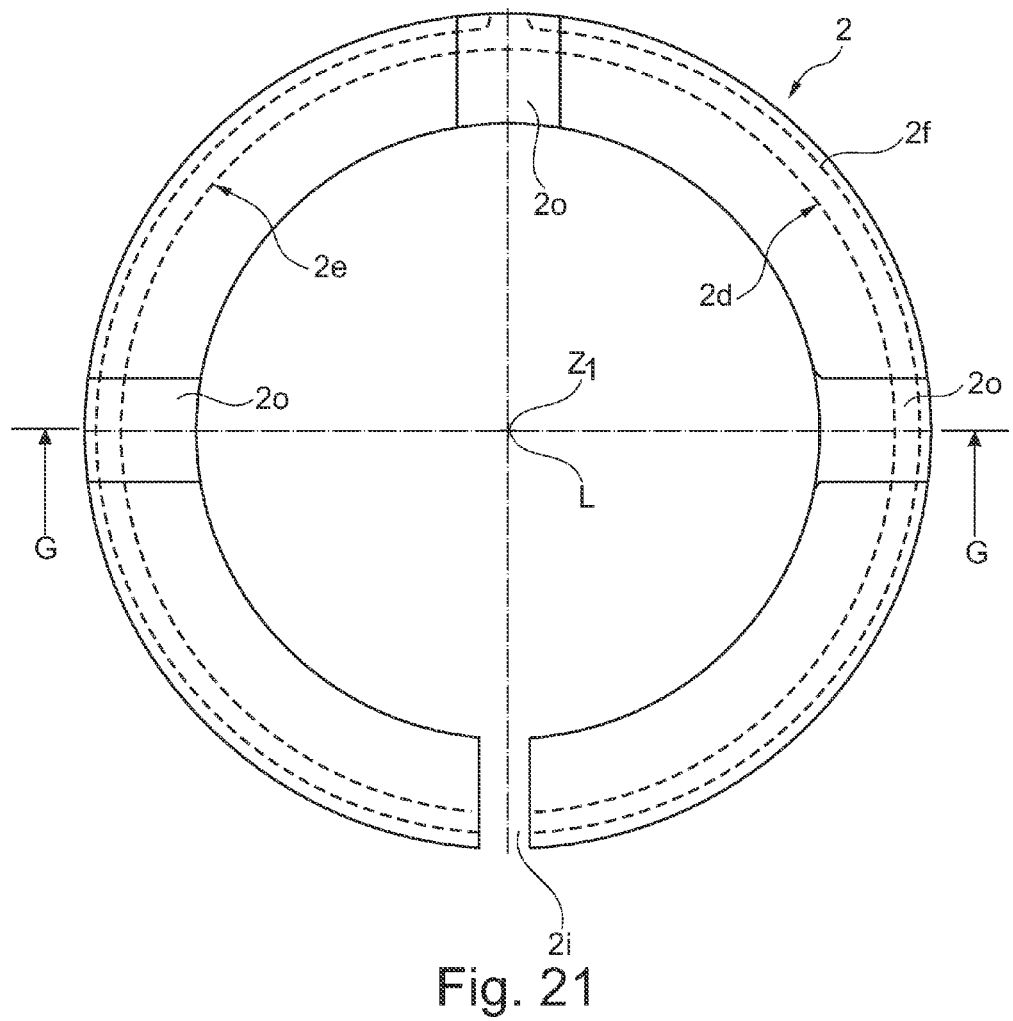
FIG. 21 a front view of a further ring carrier.
Figure 22:
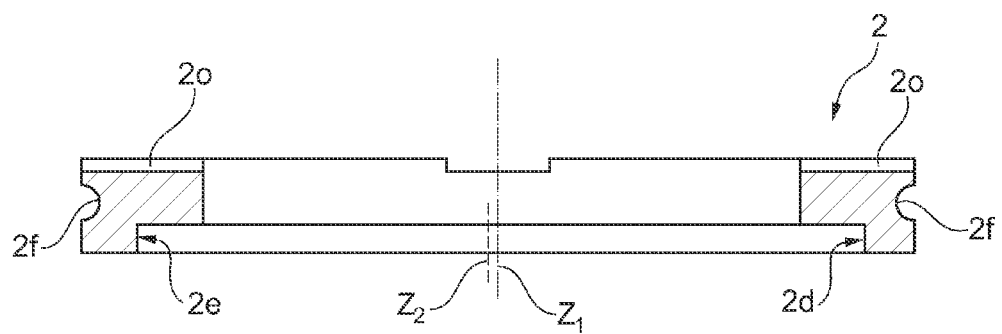
FIG. 22 a section along the line G-G through the ring carrier shown in FIG. 21.

FIG. 21 shows a plan view of a further embodiment of a ring carrier 2. Unlike the ring carrier 2 shown in FIG. 20, the ring carrier 2 shown in FIG. 21 has backflow grooves 2o. In the embodiment shown, three backflow grooves 2o are arranged spaced apart in the peripheral direction. FIG. 22 shows a section through the ring carrier 2 shown in FIG. 21 along the line G-G. The backflow grooves 2o are designed as recesses in the ring carrier 2 to allow a backflow of a fluid.

In an advantageous embodiment, the first and the second side walls 2d, 2e have the same radius of curvature R2, R3. In an advantageous embodiment, the distance between the first and the second centers Z1, Z2 has a value in the range between 0.1 and 10 mm. In an advantageous embodiment, the first gap S1 has an axial width in the range from 0.1 mm to 10 mm. In an advantageous embodiment, the sealing ring 3a, 3b is composed of a wearable material, in particular of a metal such as bronze, gray cast iron or sintered iron or of a plastic such as PEEK, filled PTFE or hollow temperature polymers such as PEEK, PI or epoxy. In an advantageous embodiment, the first side wall 2d extends over an angle of 180 degrees or approximately 180 degrees and the first gap S1 extends over an angle of 180 degrees or approximately 180 degrees. In an advantageous embodiment, the sealing ring 3a has an inner radius R which is larger than or equal to the outer radius R5 of a piston rod 6. In an advantageous embodiment, the ring carrier 2 is composed of a metal, in particular of steel, stainless steel, bronze or gray cast iron or of a plastic, in particular PEEK, filled PTFE or high-temperature polymers such as PEEK, PI or epoxy.

The invention claimed is:

1. A seal arrangement (1) for piston compressors comprising:
    a deformable ring carrier (2) as well as a first and a second continuous sealing ring (3a, 3b),
    wherein the ring carrier (2) has a longitudinal axis (L) extending perpendicular to its peripheral direction,
    wherein the ring carrier (2) has a gap (2i) with clearance in its peripheral direction,
    wherein each sealing ring (3a, 3b) has a longitudinal axis (3c, 3d) extending perpendicular to its peripheral direction, and wherein the sealing rings (3a, 3b) are arranged such that the ring carrier (2) surrounds them from the outside, and wherein the two sealing rings (3a, 3b) are arranged next to one another in the direction of extent of the longitudinal axis (L),
    wherein the ring carrier (2) and the sealing rings (3a, 3b) are designed mutually adapted such that the first sealing ring (3a) contacts a first side wall (2d) of the ring carrier (2) at the one side and forms a first gap (S1) toward the ring carrier (2) at the side disposed opposite with respect to the longitudinal axis (3c) of the first sealing ring (3a),
    wherein the second sealing ring (3b) mirror-inverted contacts a second side wall (2l) of the ring carrier (2) at the one side and forms a second gap (S2) toward the ring carrier (2) on the side disposed opposite with respect to the longitudinal axis (3d) of the second sealing ring (3b), and wherein the first and second side walls (2d, 2l) are arranged opposite with respect to the longitudinal axis (L) so that the ring carrier (2) can effect a respective preload force (5a, 5b) on the first or second sealing ring (3a, 3b) respectively via the first or second side walls (2d, 2l) respectively, wherein the preload forces (5a, 5b) extend in an opposite manner.

2. A seal arrangement (1) in accordance with claim 1, wherein the first and second sealing rings (3a, 3b) are arranged directly next to one another in the direction of extent of the longitudinal axis (L).

3. A seal arrangement (1) in accordance with claim 1, wherein the ring carrier (2) has an intermediate web (2k) between the first and second sealing rings (3a, 3b) in the direction of extent of the longitudinal axis (L).

4. A seal arrangement (1) in accordance with claim 3, wherein the intermediate web (2k) has an inner diameter which substantially corresponds to the inner diameter (R) of the first and second sealing rings (3a, 3b).

5. A seal arrangement (1) in accordance with claim 1, wherein the first and/or second sealing ring (3a, 3b) has/have the same width (3k) along the total periphery; and wherein the ring carrier (2) has a first and/or second side wall (2e, 2m) spaced apart with respect to the first and/or second sealing ring (3a, 3b) in the region of the first and/or second gap (S1, S2).

6. A seal arrangement (1) in accordance with claim 1, wherein the first contacting side wall (2d) and a first spaced apart side wall (2e) together extend in a circular or oval manner;
wherein the second contacting side wall (2l) and a second spaced apart side wall (2m) together extend in a circular or oval manner;
wherein the first and/or second sealing ring (3a, 3b) has/have such a variable width (3k) in the peripheral direction that the first gap (S1) is formed between the first sealing ring (3a) and the first spaced apart side wall (2e); and
wherein the second gap (S2) is formed between the second sealing ring (3b) and the second spaced apart wall (2m).

7. A seal arrangement (1) in accordance with claim 5, wherein a first center /Z1) as well as a radius of curvature R2 define a semicircular extent of the first contacting side wall (2d);
wherein a second center (Z2) as well as a radius of curvature R3 define a semicircular extent of the first spaced apart side wall (2e); and
wherein the first and second centers (Z1, Z2) are mutually spaced apart.

8. A seal arrangement (1) in accordance with claim 7, wherein the two radii of curvature R2 and R3 are identical.

9. A seal arrangement (1) in accordance with claim 7, wherein the distance between the first and second centers (Z1, Z2) lies in the range between 0.1 and 10 mm.

10. A seal arrangement (1) in accordance with claim 1, wherein the first and/or second gap (S1, S2) has/have a maximum width in the range from 0.1 mm to 10 mm.

11. A seal arrangement (1) in accordance with claim 1, wherein the sealing rings (3a, 3b) are composed of a wearable material, in particular of a metal.

12. A seal arrangement (1) in accordance with claim 1, wherein the first and/or second contacting side wall (2d, 2l) extend/extends over an angle of 180 degrees or approximately 180 degrees; and
wherein the first and/or second gaps (S1, S2) extends/extend over an angle of 180 degrees or approximately 180 degrees.

13. A seal arrangement (1) in accordance with claim 1, wherein the sealing ring (3a, 3b) has an inner radius (R) which is larger than or equal to the outer radius of a piston rod (6).

14. A seal arrangement (1) in accordance with any claim 1, wherein a clamping ring (4) surrounds the ring carrier (2) from the outside in the peripheral direction.

15. A seal arrangement (1) in accordance with claim 1, wherein the ring carrier (2) is composed of a metal.

16. A seal arrangement (1) in accordance with claim 1, further comprising a security against rotation (10) which is designed such that a rotation of the first sealing ring (3a) and/or of the second sealing ring (3b) with respect to the ring carrier (2) is prevented.

17. A seal arrangement (1) in accordance with claim 16, wherein the security against rotation (10) includes a nose (31) which projects in the radial direction and which can be arranged in the gap (2i) of the ring carrier (2).

18. A seal arrangement (1) in accordance with claim 16, wherein the security against rotation (10) includes a pin (10a) as well as a bore (10b) in the ring carrier (2) and a bore (10c) in the first sealing ring (3a) and/or in the second sealing ring (3b), with the pin (10) introduced into the bores (10b, 10c) being designed such that it prevents a mutual rotation of the ring carrier (2) with respect to the first sealing ring (3a) and/or the second sealing ring (3b).

19. A seal arrangement (1) in accordance with claim 1, wherein the first and/or second sealing ring (3a, 3b) projects/project beyond the ring carrier (2) in the direction of the longitudinal axis (L).

20. A seal arrangement (1) for piston compressors comprising:
a deformable ring carrier (2) as well as a continuous first sealing ring (3a),
wherein the ring carrier (2) has a longitudinal axis (L) extending perpendicular to its peripheral direction,
wherein the ring carrier (2) has a gap (2i) with clearance in its peripheral direction, and wherein the ring carrier (2) is designed in L shape with a side part (2n) extending perpendicular to the longitudinal axis (L) and a surrounding part (2m) extending in the direction of the longitudinal axis (L),
wherein the first sealing ring (3a) has a longitudinal axis (3c) extending perpendicular to its peripheral direction, and wherein the first sealing ring (3a) is arranged in the ring carrier (2) such that the surrounding part (2m) surrounds the first sealing ring (3a) from the outside, and wherein the first sealing ring (3a) is arranged next to the side part (2n) and contacting it in the direction of extent of the longitudinal axis (L),
wherein the ring carrier (2) and the first sealing ring (3a) are designed mutually adapted such that when they contact a piston rod (6), the first sealing ring (3a) contacts a first side wall (2d) of the ring carrier (2) at the one side and forms a first gap (S1) toward the ring carrier (2) at the side disposed opposite with respect to the longitudinal axis (3c) of the first sealing ring (3a), and
wherein the ring carrier (2) has a second side wall (2e) which is arranged opposite the first side wall (2d) with respect to the longitudinal axis (L) so that the ring carrier (2) can effect a preload force (5a) on the first sealing ring (3a) directed toward the longitudinal axis (L) via the first side wall (2d), and that a clamping ring (4) surrounds the ring carrier (2) from outside in the peripheral direction.

21. A seal arrangement (1) in accordance with claim 20, wherein the side part (2n) has a sealing surface (2c) extending in a circular manner toward the longitudinal axis (L) and has a first center (Z1) and a radius of curvature R4;

wherein the second side wall (2e) is designed extending in semicircular manner and has a second center (Z2) and a radius of curvature R3;

wherein the radius of curvature R3 is larger than the radius of curvature R4; and wherein the first and second centers (Z1, Z2) are mutually spaced apart.

22. A seal arrangement in accordance with claim 21, wherein the first side wall (2d) has a semicircular extent with a first center (Z1) and a radius of curvature R2.

23. A seal arrangement in accordance with claim 21, wherein the first and second side walls (2d, 2e) have the same radius of curvature R2, R3.

24. A seal arrangement (1) in accordance with claim 21, wherein the distance between the first and second centers (Z1, Z2) lies in the range between 0.1 and 10 mm.

25. A seal arrangement (1) in accordance with claim 20, wherein the first gap (S1) has a maximum width in the range from 0.1 mm to 10 mm.

26. A seal arrangement in accordance with claim 20, wherein the sealing ring (3a) is composed of a wearable material, in particular of a metal or of a plastic.

27. A seal arrangement (1) in accordance with claim 20, wherein the first side wall (2d) extends over an angle of 180 degrees or approximately 180 degrees; and wherein the first gap (S1) extends over an angle of 180 degrees or approximately 180 degrees.

28. A seal arrangement (1) in accordance with claim 20, wherein the sealing ring (3a) has an inner radius (R) which is larger than or equal to the outer radius (R5) of a piston rod (6).

29. A seal arrangement (1) in accordance with claim 20, wherein ring carrier (2) is composed of a metal.

\* \* \* \* \*